(12) United States Patent
McCanless et al.

(10) Patent No.: US 10,844,979 B2
(45) Date of Patent: Nov. 24, 2020

(54) SECTIONAL GUIDE POLE FOR WIRING

(71) Applicant: ABL IP Holding LLC, Atlanta, GA (US)

(72) Inventors: Forrest Starnes McCanless, Oxford, GA (US); Brandon Roberts, Stockbridge, GA (US)

(73) Assignee: ABL IP Holding LLC, Atlanta, GA (US)

( * ) Notice: Subject to any disclaimer, the term of this patent is extended or adjusted under 35 U.S.C. 154(b) by 86 days.

(21) Appl. No.: 15/869,247

(22) Filed: Jan. 12, 2018

(65) Prior Publication Data

US 2018/0202581 A1    Jul. 19, 2018

Related U.S. Application Data

(60) Provisional application No. 62/445,825, filed on Jan. 13, 2017.

(51) Int. Cl.
| | |
|---|---|
| *F16L 3/00* | (2006.01) |
| *F16L 3/26* | (2006.01) |
| *F16B 7/18* | (2006.01) |
| *H02G 3/04* | (2006.01) |
| *F16B 7/04* | (2006.01) |
| *F16B 7/22* | (2006.01) |

(52) U.S. Cl.
CPC ............... *F16L 3/26* (2013.01); *F16B 7/182* (2013.01); *H02G 3/0493* (2013.01); *F16B 7/042* (2013.01); *F16B 7/0413* (2013.01); *F16B 7/22* (2013.01)

(58) Field of Classification Search
CPC .. F16L 3/26; F16B 7/182; F16B 7/042; F16B 7/0413; F16B 7/22
USPC ............................... 248/49, 65, 73; 403/343
See application file for complete search history.

(56) References Cited

U.S. PATENT DOCUMENTS

| | | | |
|---|---|---|---|
| 10,393,341 B2* | 8/2019 | McCanless | ............... F21V 3/02 |
| 2015/0056007 A1* | 2/2015 | Toglia | .................... F16B 7/042 |
| | | | 403/297 |

FOREIGN PATENT DOCUMENTS

WO    WO-2015086879 A1 *  6/2015  ............... E04C 3/00

* cited by examiner

*Primary Examiner* — Todd M Epps
(74) *Attorney, Agent, or Firm* — Kilpatrick Townsend & Stockton LLP

(57) ABSTRACT

A sectional guide pole for wiring includes a first support, a second support, and a joiner assembly. The first support includes a body having a first end and a second end opposite the first end. The joiner assembly includes a first joiner and a second joiner. The joiner assembly is configured to detachably secure the first support to the second support and receive the first end of the first support between the first joiner and the second joiner.

16 Claims, 12 Drawing Sheets

SECTIONAL GUIDE POLE FOR WIRING

REFERENCE TO RELATED APPLICATION

This application claims the benefit of U.S. Provisional Application No. 62/445,825, filed Jan. 13, 2017, and entitled SECTIONAL POWER POLE, the content of which is hereby incorporated by reference in its entirety.

FIELD OF THE INVENTION

This application relates to sectional guide poles for guiding cabling or wiring, and more particularly to sectional guide poles provided with a first support detachable from a second support.

BACKGROUND

In various environments, it may be desirable to guide cabling or wiring for power, communications, data, etc., to a terminal (or terminals), cash registers, stations, machines, and various other locations within a facility located away from walls (and thus the power outlets on such walls). For example, in some facilities, cabling or wiring is routed from a ceiling structure of a facility to a terminal or machine on the floor of the facility. Traditionally, unitary or monolithic guide poles have been used to guide the wiring from the ceiling to the terminal on the floor, but these poles are often long and difficult to transport, handle, and install due to their unwieldy size.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to some examples, a sectional guide pole for wiring includes a first support, a second support, and a joiner assembly. The first support includes a body having a first end and a second end opposite the first end. The joiner assembly includes a first joiner and a second joiner, and the joiner assembly is configured to detachably secure the first support to the second support and receive the first end of the first support between the first joiner and the second joiner.

In certain cases, the first support further includes a first channel and a second channel opposite the first channel, and the joiner assembly is configured to detachably secure the first support to the second support such that the first joiner is partially in the first channel and the second joiner is partially in the second channel. In various aspects, the second support includes a body having a first end, a second end opposite the first end, a first channel, and a second channel opposite the first channel, and the joiner assembly is detachably secured to the second support such that the first joiner is partially in the first channel and the second joiner is partially in the second channel. According to certain examples, the first support further includes a guiding channel, the second support includes a guiding channel, and the sectional guide pole further includes a cover detachably secured to the first support and the second support and covering the guiding channels of the first support and the second support.

In various examples, the sectional guide pole further includes a first mating component on the joiner assembly and a second mating component on the first support or the second support. In various cases, the first mating component is configured to engage the second mating component such that the first support is secured to the second support through the joiner assembly. In some examples, the first mating component includes a latch having an arm, and the second mating component includes a hook. In certain cases, the first mating component includes at least one locking tab, and the second mating component includes at least one locking aperture.

According to various examples, a sectional guide pole for wiring includes a first support, a second support, and a joiner assembly. The first support defines a guiding channel, the second support defines a guiding channel, and the joiner assembly defines a receiving gap. The joiner assembly is configured to detachably secure the first support to the second support such that the guiding channel of the first support is aligned with the guiding channel of the second support by receiving a portion of at least one of the first support and the second support within the receiving gap.

In certain examples, the joiner assembly includes a first joiner and a second joiner, the first joiner includes an upper surface and a lower surface, the second joiner includes an upper surface and a lower surface, and the lower surface of the first joiner faces the lower surface of the second joiner. In some cases, the receiving gap is defined between at least a portion of the lower surface of the first joiner and at least a portion of the lower surface of the second joiner. According to some examples, the guiding channel of the first support is an upper guiding channel, and the first support further includes a lower guiding channel opposite the upper guiding channel. In various aspects, the sectional guide pole further includes at least one cover detachably secured to the first support and the second support and such that the guiding channels of the first support and the second support are covered. In some cases, the sectional guide pole further includes a first mating component on the joiner assembly and a second mating component on the first support or the second support where the first mating component is configured to engage the second mating component such that the first support is secured to the second support through the joiner assembly.

According to various examples, a method of assembling a sectional guide pole for wiring includes: detachably securing a joiner assembly on a first support of the sectional guide pole; inserting an end of a second support of the sectional guide pole into a receiving gap defined by a first joiner and a second joiner of the joiner assembly; and detachably securing the second support to the joiner assembly such that the second support is positioned relative to the first support.

In certain cases, detachably securing the second support to the joiner assembly includes positioning the second support relative to the first support such that a guiding channel of the first support is aligned with a guiding channel of the second support. In some examples, detachably securing the second support to the joiner assembly includes engaging a first mating component on the joiner assembly with a second mating component on the second support. In various aspects, the first mating component includes a latch having an arm, and the second mating component includes a hook. In some cases, the first mating component includes at least one locking tab, and wherein the second mating component includes at least one locking aperture.

In some examples, detachably securing the joiner assembly on the first support includes inserting an end of the first support between the first joiner and the second joiner such that a portion of the first support is between the first joiner and the second joiner and securing the joiner assembly relative to the first support. In various aspects, inserting the end of the second support into the receiving gap defined by a first joiner and a second joiner of the joiner assembly includes positioning a portion of the first joiner in a first channel defined by the second support and positioning a portion of the second joiner in a second channel defined by the second support.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "left," "right," "front," and "back," among others are intended to refer to the orientation as illustrated and described in the figure (or figures) to which the components and directions are referencing.

Figure 1:
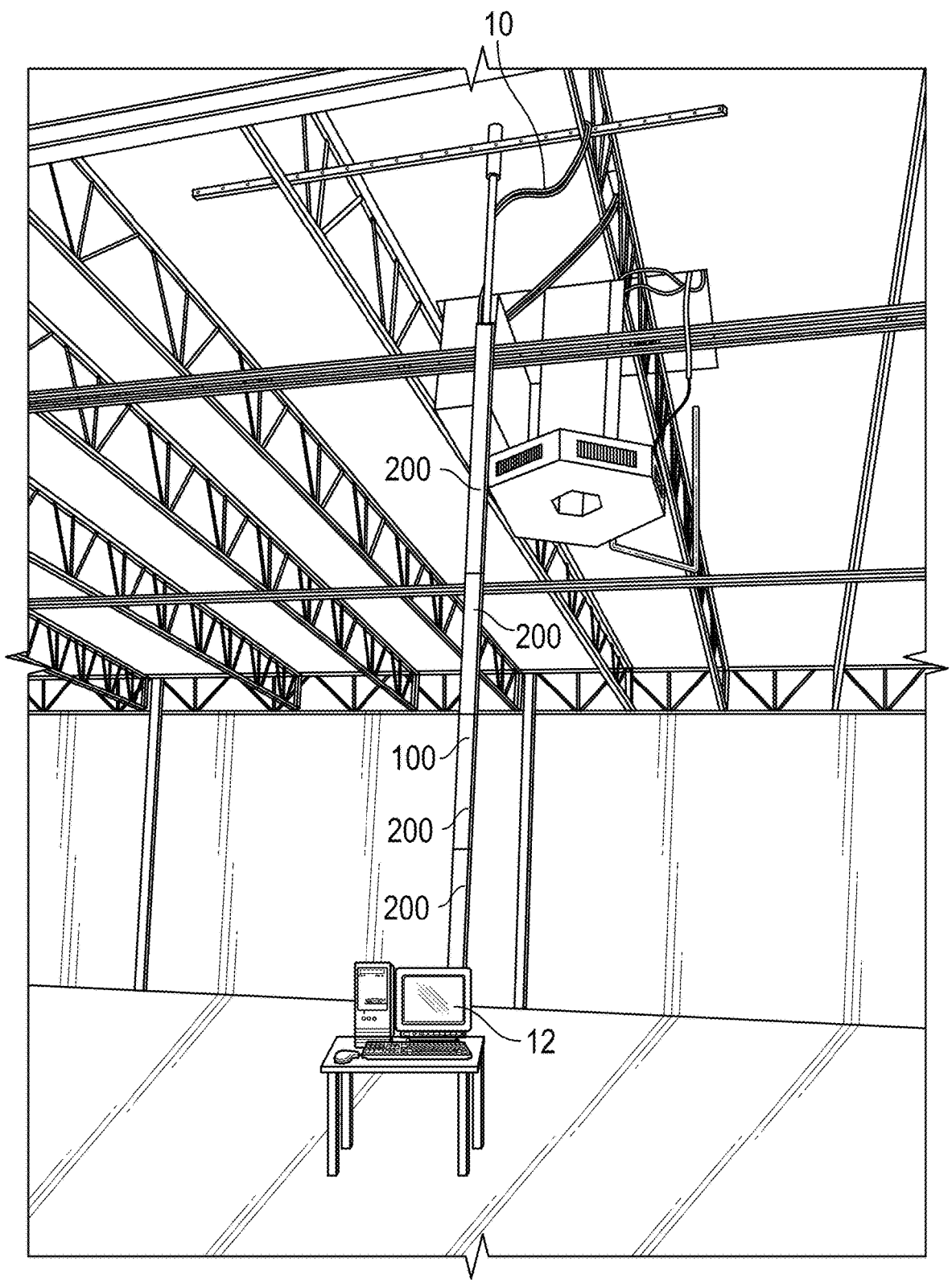
FIG. 1 is a perspective view of a guide pole guiding wiring in a facility according to aspects of the current disclosure.

Referring to FIG. 1, in various environments, it may be desirable to guide cabling or wiring 10 for power, communications, data, etc. to a terminal 12 (or terminals), cash registers, stations, machines, and various other away-from-wall locations in a facility. For example, in some facilities, cabling or wiring 10 is routed from a ceiling structure of a facility to a terminal 12 or machine on the floor of the facility. In various examples, a sectional guide pole 100 having at least two supports 200 that may be assembled and disassembled may be used to guide the wiring 10. It will be appreciated that the number of supports 200 should not be considered limiting on the current disclosure, as in various examples, any number of supports 200 may be utilized. In the non-limiting example illustrated in FIG. 1, the sectional guide pole 100 includes four supports 200

Referring to FIGS. 2-7, in some examples the sectional guide pole 100 includes a first support 200A, a second support 200B, and a joiner assembly 300 that is configured to detachably secure the first support 200A to the second support 200B. In certain examples, the sectional guide pole 100 is a tool-less assembly, meaning that no additional tools other than the components described below are required to assemble the guide pole 100. The sectional guide pole 100 may be shipped with the supports 200A-B disassembled and then assembled on-site using the joiner assembly 300, thereby making shipping and installation easier. Moreover, because additional tools are not required to assemble the guide pole 100, installation and assembly of the guide pole 100 is easier. Although two supports 200A-B and one joiner assembly 300 are illustrated, the sectional guide pole 100 may include any number of supports 200 and joiner assemblies 300. For example, in other cases, additional or fewer supports may be utilized depending on a desired overall length of the guide pole 100.

Figure 2:
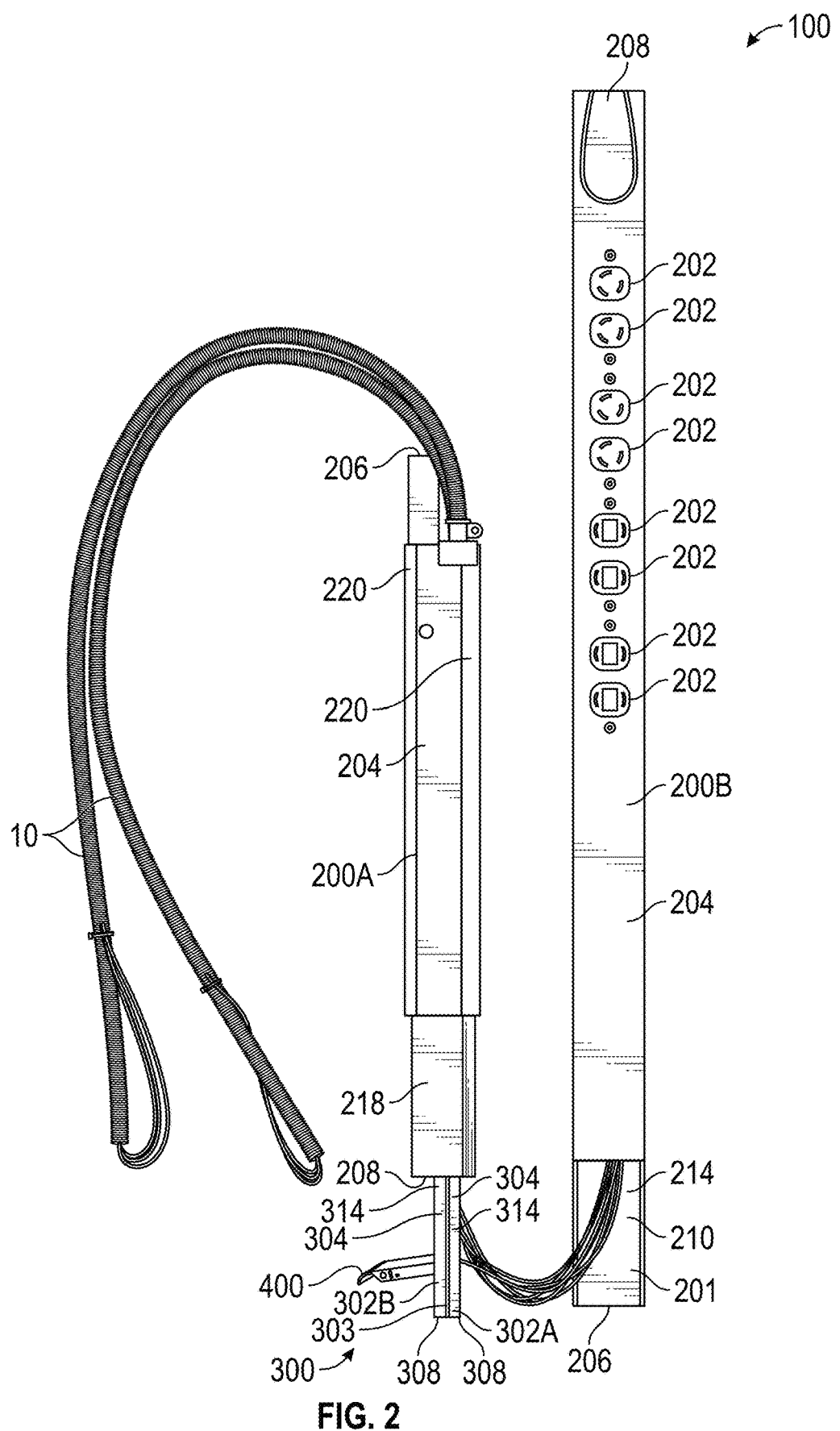
FIG. 2 is a perspective view of an embodiment of a guide pole with a first support detached from a second support.

The following description is made with reference to the first support 200A, although it will be appreciated that the description is equally applicable to the second support 200B and some features are more easily seen in the figures by reference to the second support 200B. As illustrated in FIGS. 2-7, the first support 200A includes a body 204 having a first end 206 and a second end 208. The body 204 includes a plate 201 extending from the first end 206 to the second end 208 (see FIGS. 3 and 4) of the body 204. The plate 201 has a first plate surface 210 and a second plate surface (not shown) opposite the first plate surface 210. The first support 200A is configured to guide the wiring 10 along the body 204, as illustrated in FIG. 2. In some embodiments, the body 204 optionally includes side flanges 218 that extend along the edges of the plate 201. In the embodiment illustrated in FIGS. 2-7, the body 204 resembles an I-beam, although the body 204 may have myriad other shapes. In the illustrated embodiments, the side flanges 218 and plate 201 define a first side channel 214 on one side of the plate 201 and a second side channel 216 on the opposite side of the plate 201. The first side channel 214, the second side channel 216, or both may guide the wiring 10 along the first support 200A.

Referring to FIG. 2, in some embodiments, at least one of the supports, such as the second support 200B, may include various outlets or other types of connectors 202 such that various components of the terminal 12 may connect with the wiring 10. In other examples, the connectors 202 may be omitted.

In some embodiments, the sectional guide pole 100 optionally includes a cover 220 or a plurality of covers 220 attached to the supports 200A-B. The covers may be secured to the supports 200A-B with mechanical fasteners or may be snap-fit onto the supports 200A-B. The covers 220 may enclose and conceal the wiring 10 extending along the supports 200A-B (such as along the first side channel 214 and/or the second side channel 216) (see FIG. 12) and may optionally help guide the wiring 10 along the supports 200A-B. In some examples, at least some of the covers 220 may be pre-installed on the supports before the sectional guide pole 100 is shipped to the customer, although they need not be.

A joiner assembly 300 is designed to couple to adjacent ends of the supports 200A-B so as to attach the supports to each other to form the sectional guide pole 100. The joiner assembly 300 includes a first joiner 302A and a second joiner 302B secured to the first support 200A, as described in detail below. Although the joiner assembly 300 is described as two components secured together, it will be appreciated that in various other examples, any number of components may be used to form the joiner assembly 300. For example, in some embodiments, the joiner assembly 300 may be molded or cast as a unitary component are monolithically formed.

Referring to the first joiner 302A, it will be appreciated that the following description is equally applicable to the second joiner 302B. The first joiner 302A includes a body 304 having a first end 306 (see FIG. 8) and a second end 308. The body 304 defines an upper surface 310 and a lower surface 312 (see FIG. 9) opposite the upper surface 310. Both the upper surface 310 and the lower surface 312 extend from the first end 306 to the second end 308. In some embodiments, the body 304 optionally includes side flanges 314. In various embodiments, the side flanges 314 of the first joiner 302A may abut and slide along the side flanges 218 of the first support 200A and the second support 200B when the sectional guide pole 100 is assembled, as described in detail below. In various examples, the body 304 optionally includes ribbing 301 (best seen in FIG. 9) that is configured to facilitate sliding of the first joiner 302A relative to the supports 200A-B by engaging complementary features 316 (e.g., slots, channels, ribs, or other suitable features) on the supports 200A-B. The ribbing 301 may also help retain and align the first joiner 302A relative to the supports 200A-B by engaging the complementary features 316 of the supports 200A-B.

In certain embodiments, the body 304 may optionally define securing apertures 318 (see FIG. 9) that are configured to accommodate fasteners 320 (see FIG. 3), although it need not. As described in detail below, the fasteners 320 secure the first joiner 302A and the second joiner 302B to the first support 200A. The fasteners 320 may comprise various securing mechanisms including, but not limited to, screws, pins, bolts, hooks, clips, clasps, adhesives, snap-fitting, and various other suitable securing mechanisms.

Figure 3:
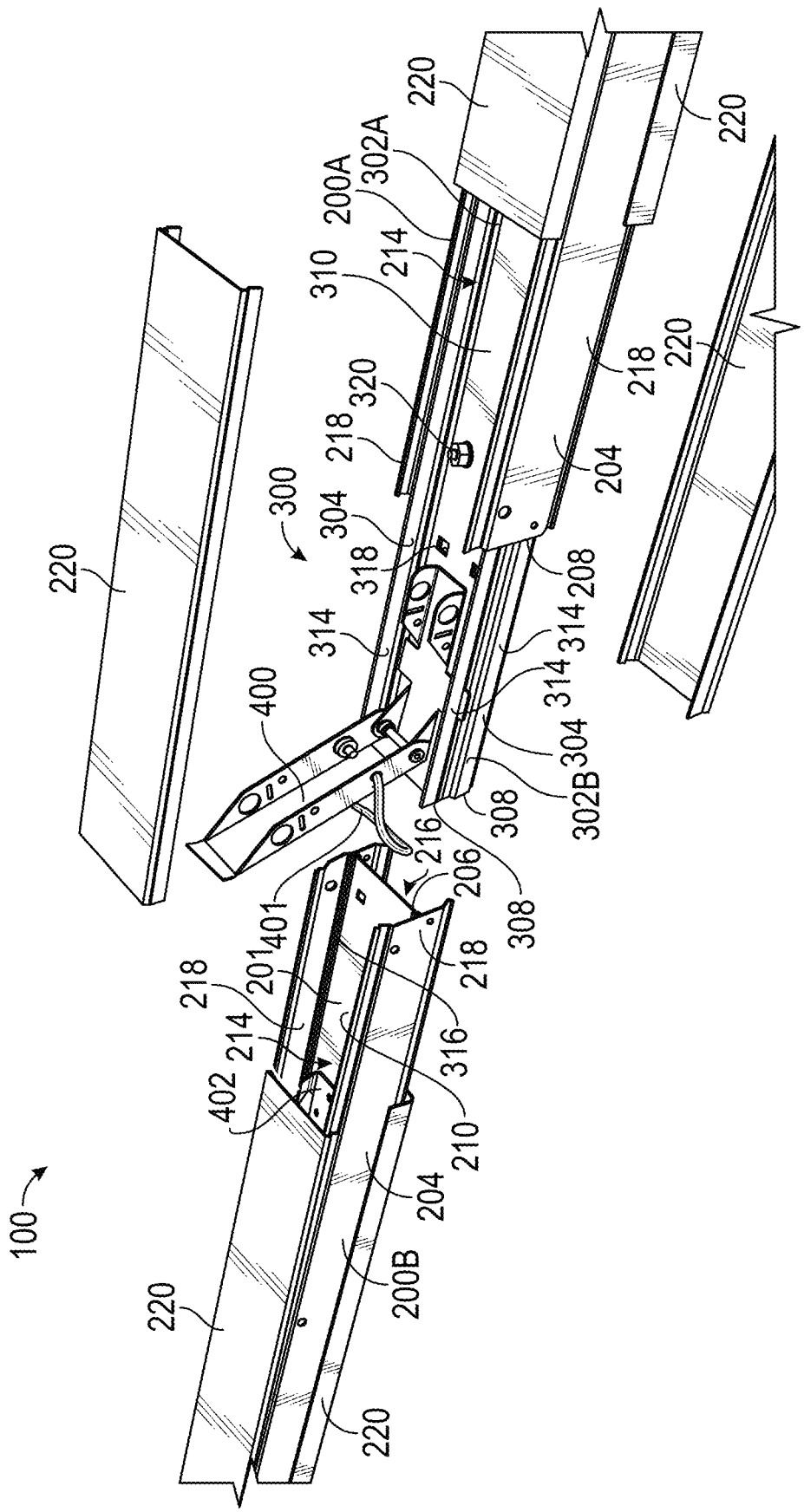
FIG. 3 is a partial perspective view of the first support, the second support, and a joiner assembly of the guide pole of FIG. 2.
Figure 4:
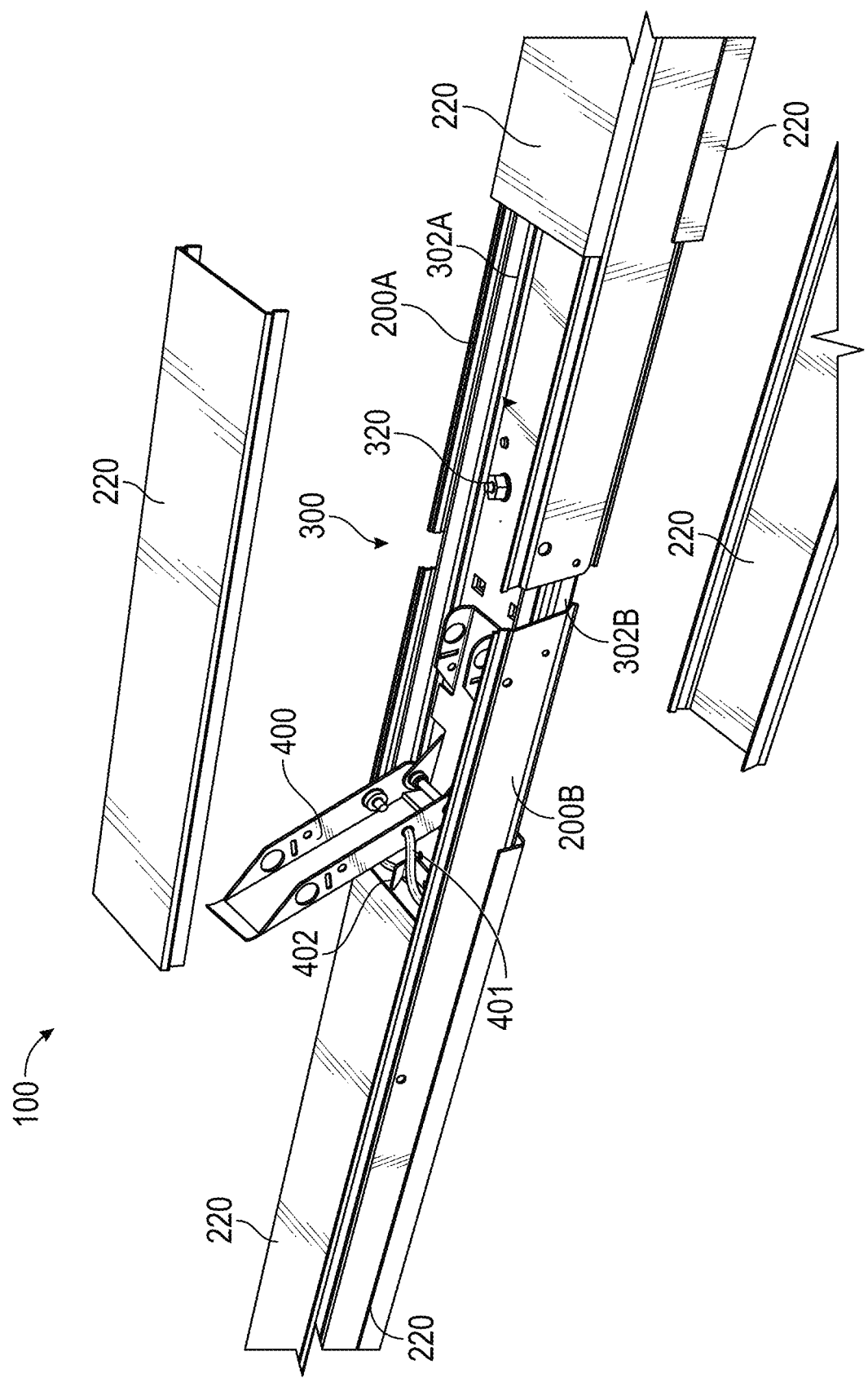
FIG. 4 is another partial perspective view of the first support, the second support, and the joiner assembly of the guide pole of FIG. 2.
Figure 5:
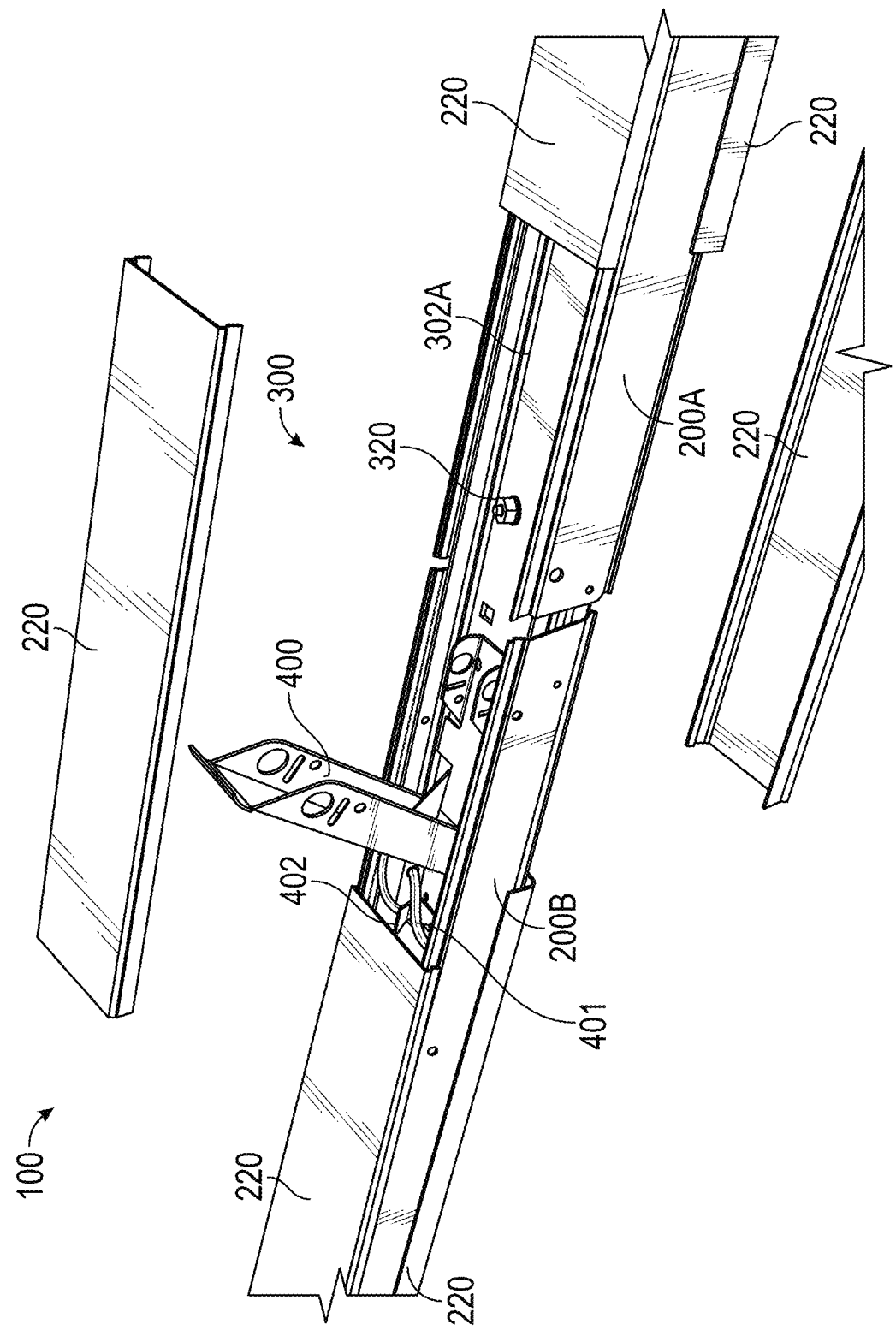
FIG. 5 is another partial perspective view of the first support, the second support, and the joiner assembly of the guide pole of FIG. 2.
Figure 6:
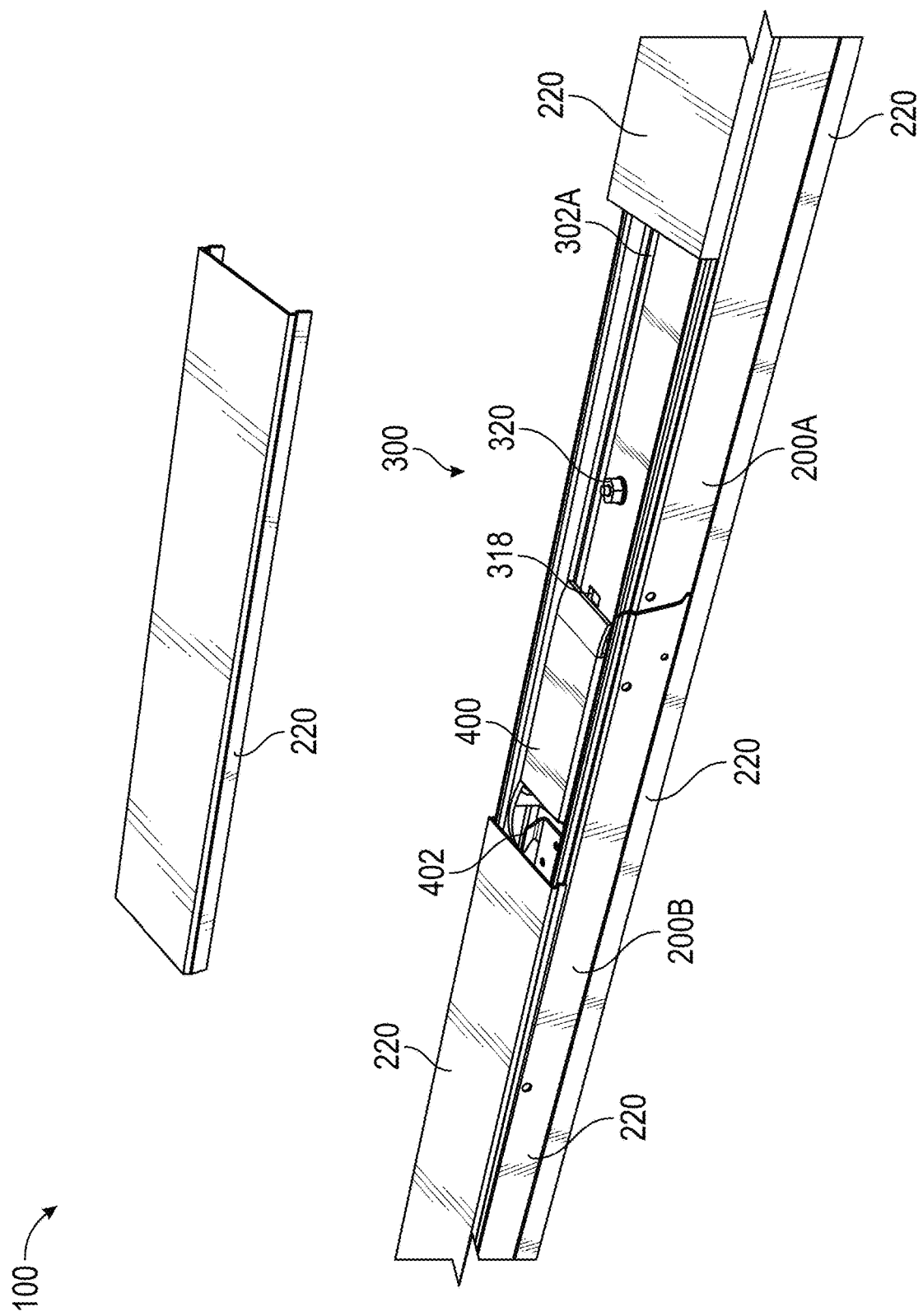
FIG. 6 is another partial perspective view of the first support, the second support, and the joiner assembly of the guide pole of FIG. 2.

To secure the joiner assembly 300 to the first support 200A, the first joiner 302A and the second joiner 302B are each inserted into the second end 208 of, or otherwise positioned on, the first support 200A but on opposing sides of the plate 201. The first joiner 302A and second joiner 302B are positioned on and attached to the first support 200A such that a portion of them extends beyond the second end 208 of first support 200A. When positioned on first support 200A, the lower surfaces 312 of each of the first joiner 302A and the second joiner 302B are adjacent the upper plate surface 310 and opposing second plate surface, respectively. In some embodiments, as illustrated in FIG. 3, the second end 308 of the first joiner 302A co-terminates with the second end 308 of the second joiner 302B, although it need not. Fasteners 320 or other securing mechanisms may be inserted into the securing apertures 318 of the first joiner 302A and second joiner 302B as well as through the first support 200A to retain the first and second joiners 302A-B in position of the first support 200A.

Attachment of the first and second joiners 302A-B on the first support 200A creates a receiving gap 303 (best seen in FIG. 2) between the first joiner 302A and the second joiner 302B at their second ends 308. The receiving gap 303 is dimensioned to receive at least a portion of the body 204 of the second support 200B (and more specifically a portion of plate 201) when the sectional guide pole 100 is assembled, as described in detail below. In other words, when the first support 200A is assembled with the joiner assembly 300, a portion of the first support 200A is sandwiched between a portion of the first joiner 302A and a portion of the second joiner 302B.

The sectional guide pole 100 includes a first mating component on the joiner assembly 300 and a second mating component on the second support 200B. The second mating component is configured to engage the first mating component to secure the second support 200B to the joiner assembly 300 and thus also to the first support 200A. It will be appreciated that various types of mating components may be used as the first and second mating components that are suitable for detachably securing the first support 200A to the second support 200B. For example, the first and second mating components may include, but are not limited to latches and hooks, tabs and apertures, snap-fittings, hooks, clips, clasps, fasteners, pins, nuts and bolts, springs, and various other mating components or combinations of mating components.

For example, referring to FIGS. 2-7, in some embodiments, the first mating component comprises a latch 400 (with arm 401) and the second mating component comprises a hook 402. In these embodiments, the latch 400 is secured to the upper surface 310 of the first joiner 302A and the hook 402 is secured to the first plate surface 210 of the second support 200B. In various embodiments with the latch 400 and the hook 402, when the arm 401 of the latch 400 is engaged with the hook 402, the latch 400 is pivotable between an unlocked position (see FIGS. 4 and 5) and a locked position (see FIG. 6). Movement of the latch 400 between the locked and unlocked positions may movably position the second support 200B relative to the first support 200A between an unlocked position (see FIG. 4) and a locked position (see FIG. 6).

In the unlocked position, a portion of the plate 201 of the second support 200B is positioned within the receiving gap 303 between the first joiner 302A and the second joiner 302B such that the first end 206 of the second support 200B is spaced a distance from the second end 208 of the first support 200A. Pivoting of the latch 400 gradually draws the ends of the first and second supports 200A-B together until, in the locked position (see FIG. 6), the ends are substantially abutting. In various embodiments, a fastener (not shown), such as a tie-down, pin, nut, bolt, screw, clip, clasp, hook, etc. may optionally be used to retain the latch 400 in the locked position. In certain examples, the joiner assembly 300 optionally includes locking openings 318 that may receive the tie-down or other component used to retain the latch 400 in the locked position. Once joined, one or more covers 220 may be positioned on the supports 200A-B to span the joint between the first and second supports 200A-B (see FIG. 7).

Figure 8:
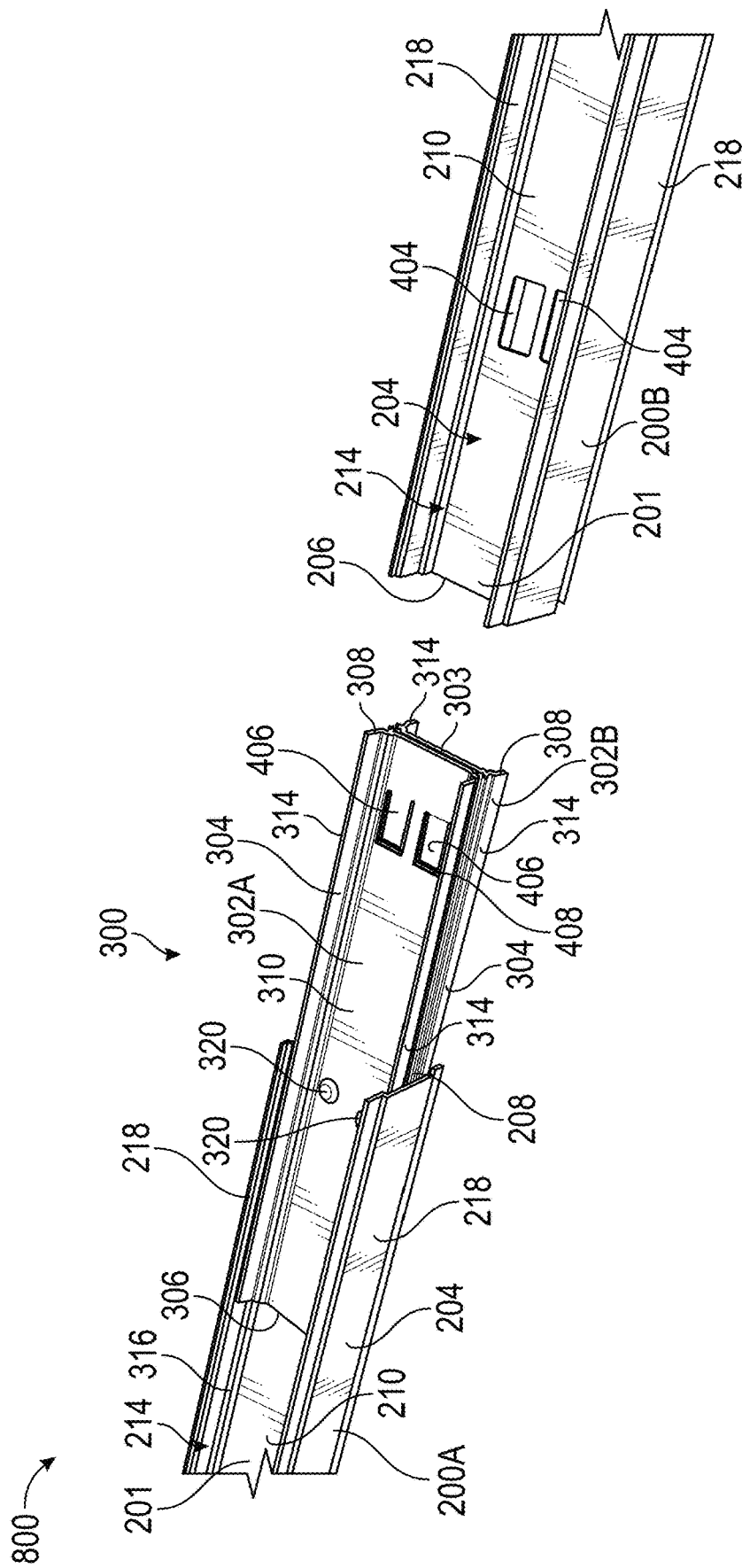
FIG. 8 is a partial perspective view of a first support, a second support, and a joiner assembly of a guide pole according to another embodiment of the current disclosure.
Figure 9:
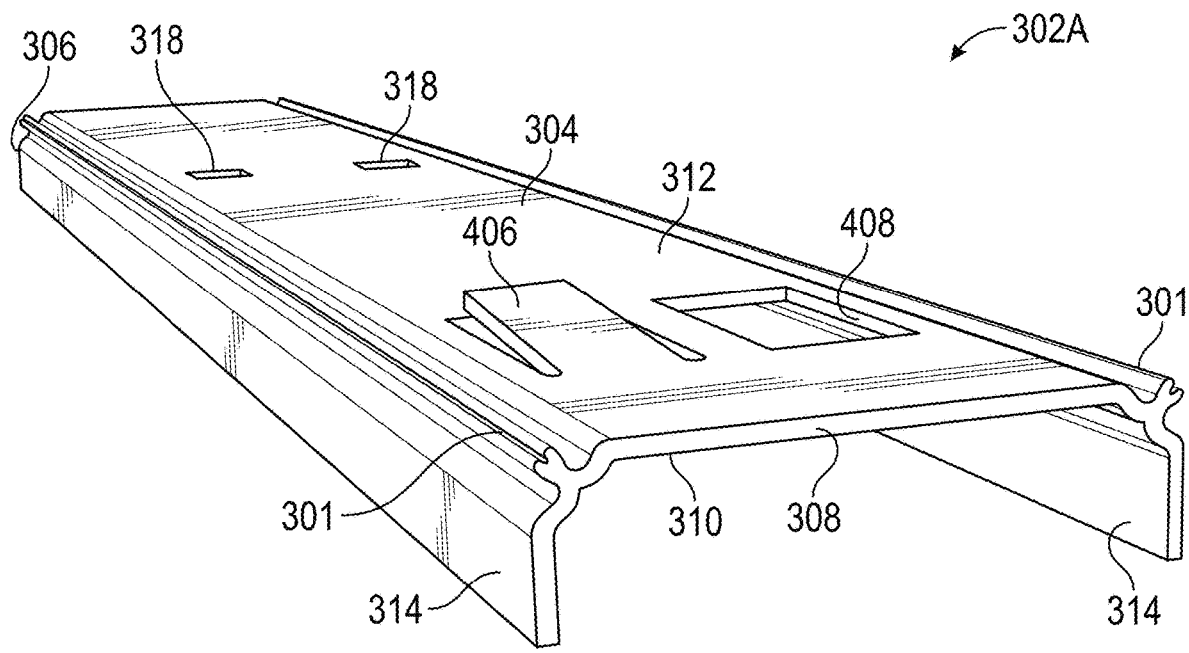
FIG. 9 is a perspective view of a first joiner of the joiner assembly of FIG. 8.

Referring to FIGS. 8-12, another example of a sectional guide pole 800 is illustrated. Compared to the sectional guide pole 100, with the sectional guide pole 800, the joiner assembly 300 and the second support 200B snap-fit together such that they are self-locking. In one non-limiting example, tab apertures 404 are provided on the second support 200B. As illustrated in FIG. 8, in these embodiments, the second support 200B defines two tab apertures 404; however, in various other embodiments, any desired number of tab apertures 404 may be defined by the second support 200B.

Tabs are provided on the first and second joiners 302A-B and engage the apertures 404 so as to retain the joiner assembly 300 and the second support 200B together. In the illustrated embodiment, a locking aperture 408 and a locking tab 406 are provided on each of the first and second joiners 302A-B (see FIG. 9). The locking tab 406 on each joiner 302A-B extends at an angle away from the lower surface 312 of the joiner in a direction opposite the upper surface 310. Thus, the locking tabs 406 are non-planar with the upper surface 310 and the lower surface 312 of the joiners 302A-B in an uncompressed state. The locking tabs 406 are configured to elastically deform when compressed such that they may return to their angled configuration when released from a compressed state. The locking aperture 408 and locking tab 406 on each joiner 302A-B are oriented such that, when the lower surfaces 312 of first and second joiners 302A-B abut (see FIG. 10), the locking tab 406 of one of the first and second joiners 302A-B engages and extends through the locking aperture 408 of the other one of the first and second joiners 302A-B.

In various other embodiments, locking tabs 406 may be omitted from one of the joiners, such as the second joiner 302B, and the first joiner 302A may include one or more locking tabs 406 that may engage both the locking aperture 408 of the second support 200B and locking apertures 408 of the second joiner 302B. Various other locking combinations may be provided.

Figure 10:
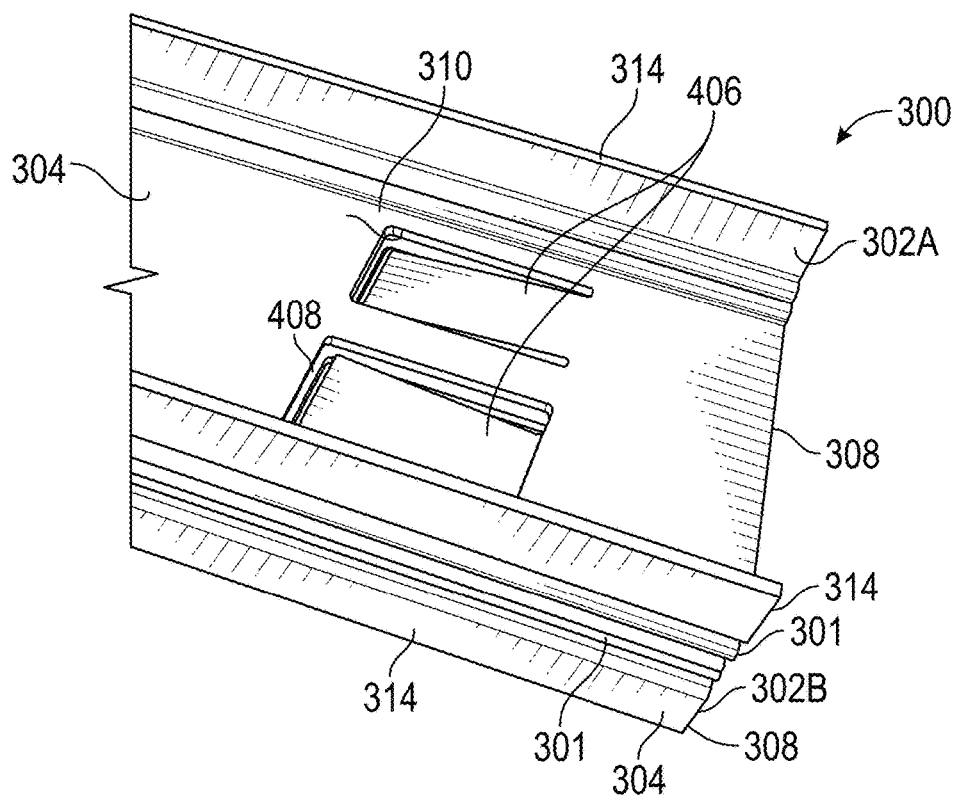
FIG. 10 is a partial perspective view of the first joiner and a second joiner of the joiner assembly of FIG. 8.

Referring to FIG. 10, when the joiner assembly 300 is attached to the second support 200B, the locking tab 406 of the first joiner 302A is aligned with the locking aperture 408 of the second joiner 302B, and the locking tab 406 of the second joiner 302B is aligned with the locking aperture 408 of the first joiner 302A. In these examples, the locking tab 406 of the first joiner 302A may extend at least partially into the locking aperture 408 of the second joiner 302B. In a similar manner, the locking tab 406 of the second joiner 302B may extend at least partially into the locking aperture 408 of the first joiner 302A.

Figure 11:
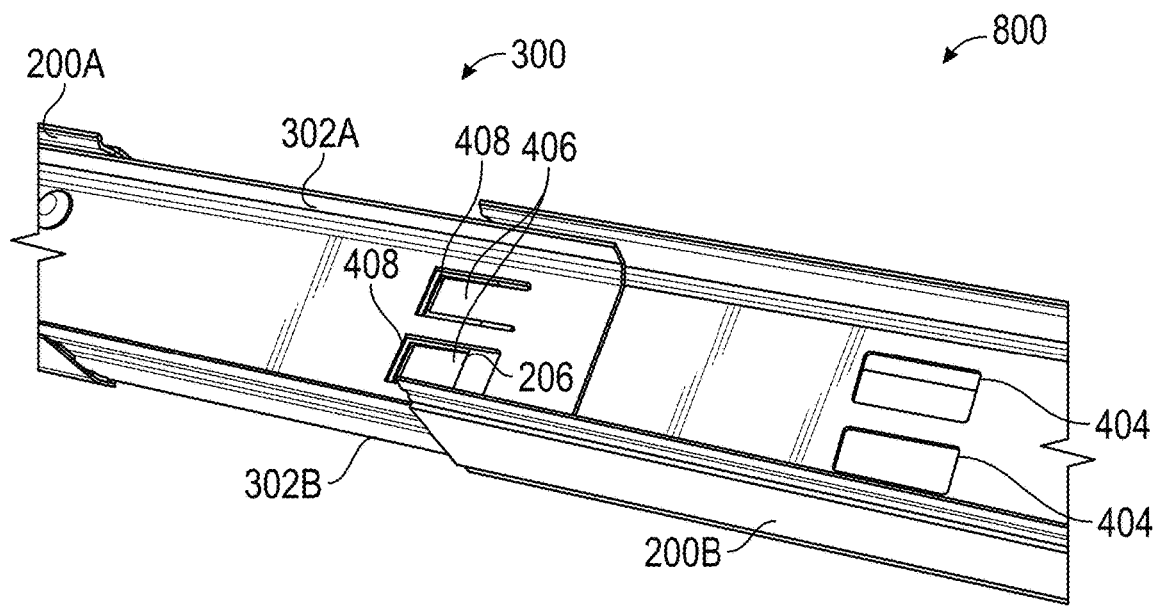
FIG. 11 is a partial perspective view of the first support, the second support, and the joiner assembly of the guide pole of FIG. 8.
Figure 12:
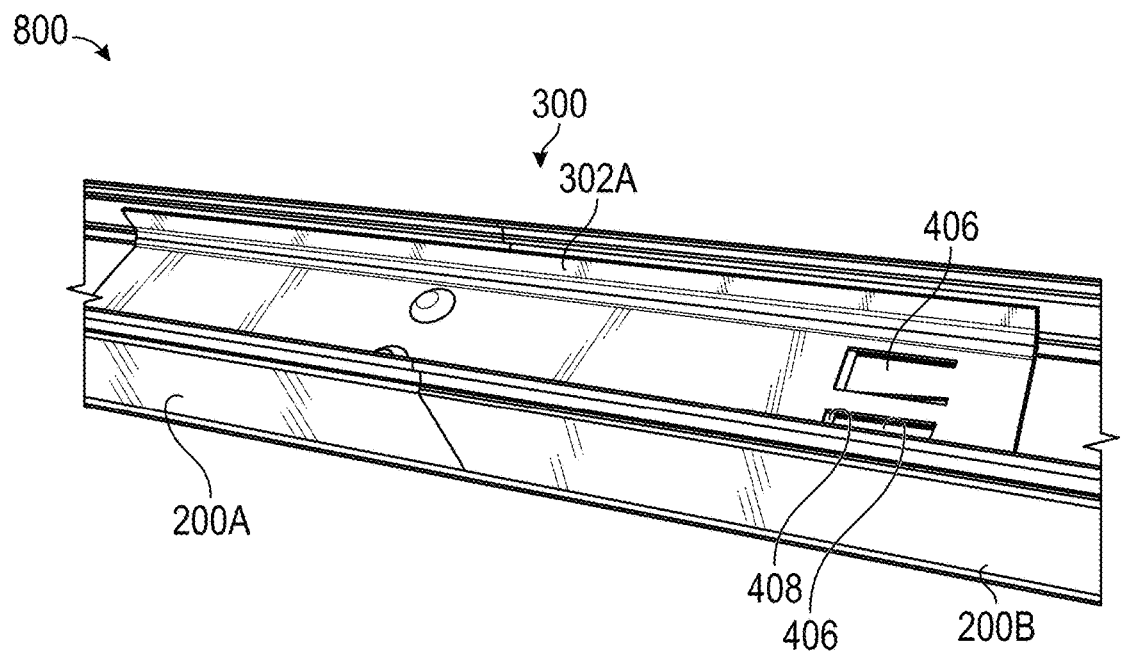
FIG. 12 is another partial perspective view of the first support, the second support, and the joiner assembly of the guide pole of FIG. 8.

As illustrated in FIG. 11, as the second support 200B is inserted into and slid within the receiving gap 303 between the first joiner 302A and the second joiner 302B, the second support 200B compresses the locking tabs 406. However, as the locking tabs 406 encounter the tab apertures 404 on the second support 200B, they are able to spring back to their uncompressed state and engage the tab apertures 404. In an engaged position, as illustrated in FIG. 12, the locking tabs 406 and locking apertures 408 are aligned with the tab apertures 404 of the second support 200B. When the locking tabs 406 and locking apertures 408 are aligned with the tab apertures 404, the locking tabs 406 may spring back to their uncompressed state extending at an angle from the bodies 304 of the joiners 302A-B. The bent locking tabs 406 may engage edges of the tab apertures 404 to secure the joiner assembly 300 in place and secure the first support 200A relative to the second support 200B.

Figure 13:
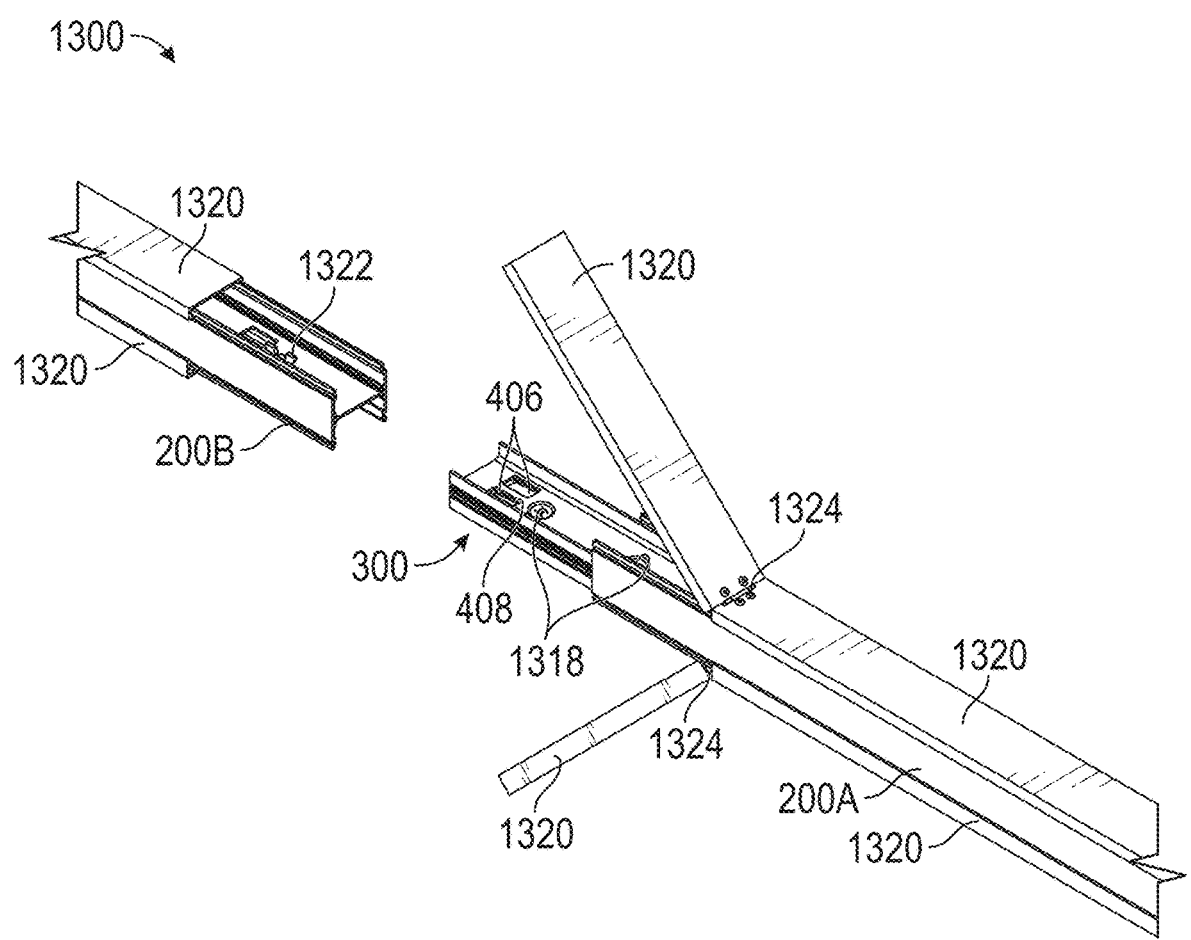
FIG. 13 is a partial perspective view of a first support, a second support, a joiner assembly, and a cover assembly of a guide pole according to another embodiment of the current disclosure.
Figure 14:
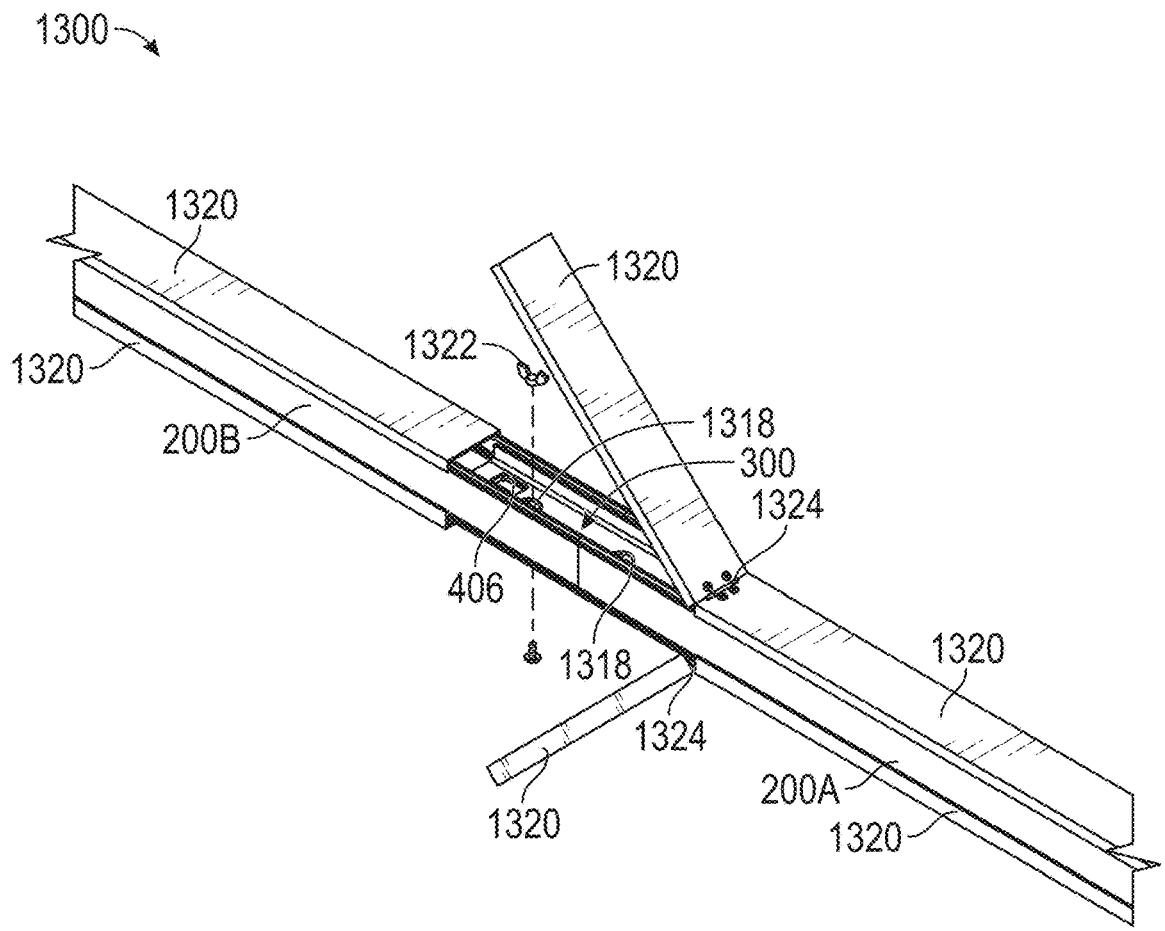
FIG. 14 is another partial perspective view of the first support, second support, joiner assembly, and cover assembly of the guide pole of FIG. 13.
Figure 15:
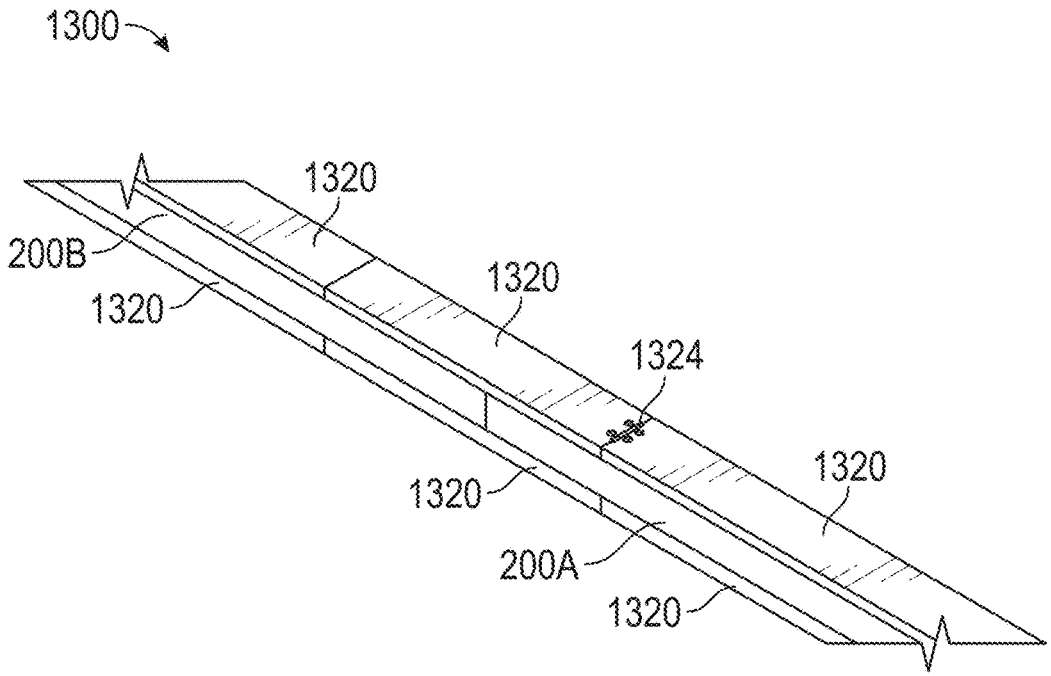
FIG. 15 is another partial perspective view of the first support, second support, joiner assembly, and cover assembly of the guide pole of FIG. 13.

FIGS. 13-15 illustrate another example of a sectional guide pole 1300. Compared to the sectional guide poles 100 and 800, the sectional guide pole 1300 includes a cover assembly 1301 with covers 1320 substantially similar to the covers 220 except that at least one cover 1320 is movably connected to another cover 1320. In addition, the joiner assembly 300 of the sectional guide pole 1300 includes securing apertures 1318 that are configured to receive a fastener 1322.

In the example illustrated in FIGS. 13-15, the cover assembly 1301 includes at least one cover movably connected to another cover 1320 through a hinge assembly 1324. In other examples, various other suitable mechanisms for movably connecting two covers 1320 may also be provided. The number of covers 1320 movably connected to each other should not be considered limiting on the current disclosure. In certain aspects, the cover assembly 1302 includes the movably connected covers 1320 at locations where two supports 200A-B are joined together to form the sectional guide pole 1300. In various examples, the movably connected covers 1320 may allow for the covers 1320 of the cover assembly 1301 to be pre-installed on the supports 200A-B, and the various covers 1320 may be rotated or moved out of position to allow for the joining of adjacent supports 200A-B (see FIGS. 13 and 14) before being moved back to a covering position (see FIG. 15).

In various examples, the securing apertures 1318 are defined by the joiners of the joiner assembly 300. Although not visible in FIGS. 13-15, the supports 200A-B may include similar apertures that are configured to align with the securing apertures 1318 when assembled. In some examples, as illustrated in FIG. 14, the fastener 1322, such as a wing nut, bolt, screw, pin, or other suitable fastening mechanism, may be secured in the securing apertures 1318 to further secure the joiner assembly 300 to the supports 200A-B. In various aspects, the fastener 1322 and securing apertures 1318 may be used in conjunction with or independently from other mating components (e.g., locking tabs 406, hook 402 and latch 400, etc.).

A method of assembling the sectional guide pole 100 is also provided. Although reference will be made to the sectional guide pole 100, it will be appreciated that a similar method may be utilized to assembly the guide pole 800 and/or the guide pole 1300. In some examples, the method includes pre-assembling the joiner assembly 300 on the first support 200A. In various embodiments, pre-assembling the joiner assembly 300 includes positioning the first joiner 302A such that the lower surface 312 of the first joiner 302A abuts the first plate surface 210 of the first support 200A and the second joiner 302B extends beyond the second end 208 of first support 200A. Extension of the first joiner 302A and the second joiner 302B beyond the second end 208 of the first support 200A forms the receiving gap 303 between the opposing lower surfaces 312 of the first and second joiners 302A-B. Pre-assembling the joiner assembly 300 also includes securing the first joiner 302A, the first support 200A, and the second joiner 302B together, such as through the fasteners 320.

The method includes inserting the second support 200B into the receiving gap between the first joiner 302A and the second joiner 302B such that the first end 206 of the second support 200B faces the second end 208 of the first support 200A. The method may also include movably positioning the second support 200B within the receiving gap such that the first end 206 of the second support 200B is moved from a position spaced from the second end 208 of the first support 200A to a position abutting the second end 208 of the first support 200A.

In various embodiments, the method includes securing the second support 200B relative to the joiner assembly 300 (and accordingly the first support 200A) by engaging the first mating component of the joiner assembly 300 with the second mating component of the second support 200B. In some embodiments, the first mating component is the latch 400 and the second mating component is the hook 402. In these embodiments, engaging the first mating component with the second mating component includes engaging the latch 400 with the hook 402 and moving the latch 400 from the unlocked position to the locked position.

In other embodiments, the first mating component includes locking tabs 406 and locking apertures 408, and the second mating component includes tab apertures 404. In these embodiments, engaging the first mating component with the second mating component includes sliding the second support 200B within the receiving gap 303 between the first joiner 302A and the second joiner 302B to compress the locking tabs 406 until the locking tabs 406 and the locking apertures 408 are aligned with the tab apertures 404. When the locking tabs 406 are aligned with the tab apertures 404 of the second support 200B, the locking tabs 406 return to their uncompressed state (extending at an angle from the bodies 304).

Figure 7:
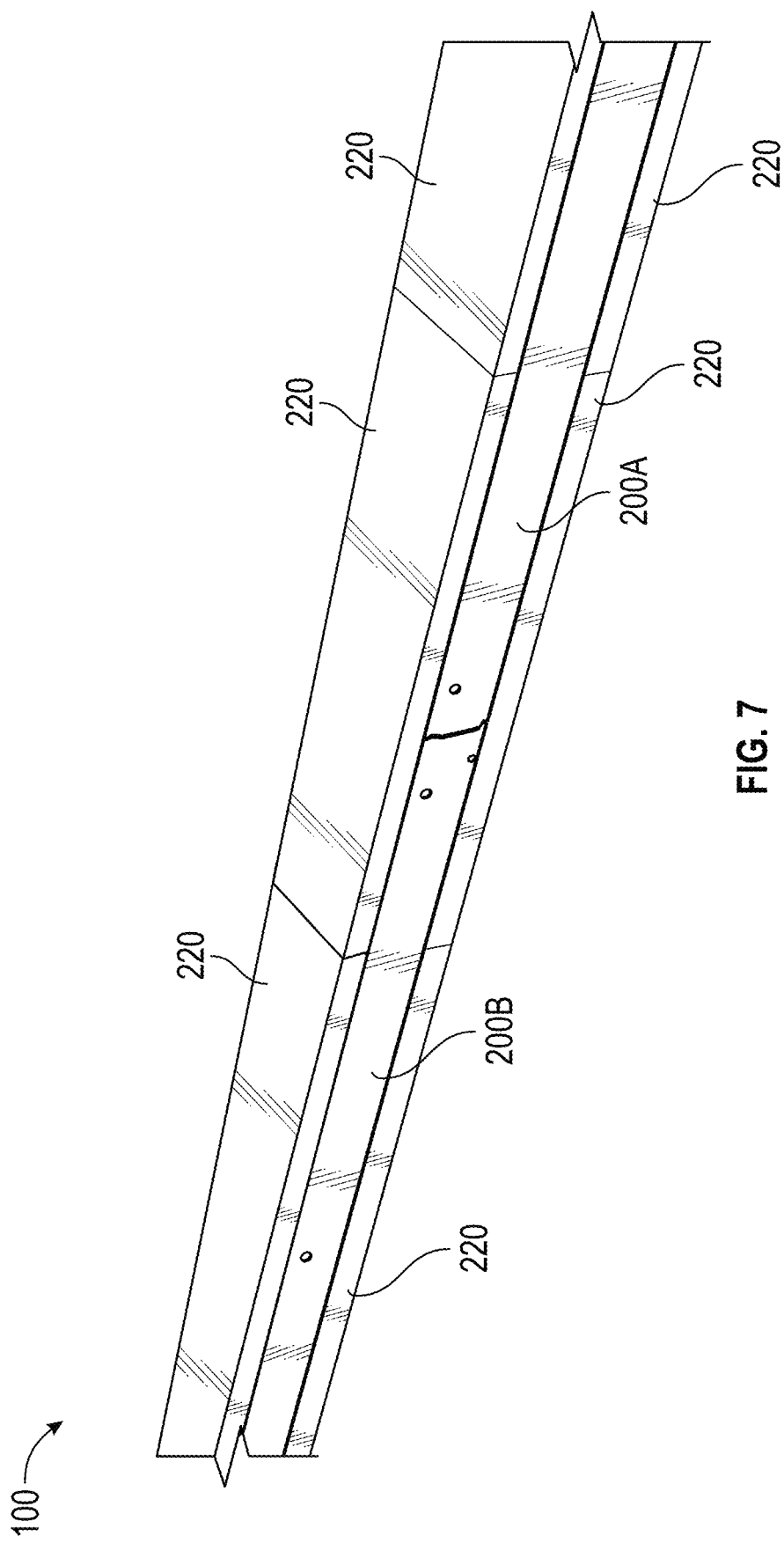
FIG. 7 is another partial perspective view of the first support, the second support, and the joiner assembly of the guide pole of FIG. 2.

As illustrated in FIG. 7, in some examples, after securing the second support 200B relative to the joiner assembly 300 (and accordingly the first support 200A), the method includes attaching covers 220 to the first support 200A and the second support 200B. The covers 220 cover the wiring 10 guided by the first support 200A and the second support 200B and hide the wiring 10 from view.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims which follow, they are used only in a generic and descriptive sense, and not for the purposes of limiting the described invention, nor the claims which follow.

That which is claimed:

1. A sectional guide pole for wiring comprising:
    a first support comprising a body having a first end and a second end opposite the first end;
    a second support; a joiner assembly comprising a first joiner and a second joiner, wherein the joiner assembly is configured to detachably secure the first support to the second support and receive the first end of the first support between the first joiner and the second joiner; and
    a first mating component on the joiner assembly and a second mating component on the first support or the second support, wherein the first mating component is configured to engage the second mating component such that the first support is secured to the second support through the joiner assembly,
    wherein the first mating component comprises at least one locking tab, and wherein the second mating component comprises at least one locking aperture.

2. The sectional guide pole of claim 1, wherein the first support further comprises a first channel and a second channel opposite the first channel, and wherein the joiner assembly is configured to detachably secure the first support to the second support such that the first joiner is partially in the first channel and the second joiner is partially in the second channel.

3. The sectional guide pole of claim 1, wherein the second support comprises a body having a first end, a second end opposite the first end, a first channel, and a second channel opposite the first channel, and wherein the joiner assembly is detachably secured to the second support such that the first joiner is partially in the first channel and the second joiner is partially in the second channel.

4. The sectional guide pole of claim 1, wherein the first support further comprises a guiding channel, wherein the second support comprises a guiding channel, and wherein the sectional guide pole further comprises a cover detachably secured to the first support and the second support and covering the guiding channels of the first support and the second support.

5. A sectional guide pole for wiring comprising:
    a first support defining a guiding channel;
    a second support defining a guiding channel; and
    a joiner assembly defining a receiving gap and configured to detachably secure the first support to the second support such that the guiding channel of the first support is aligned with the guiding channel of the second support, wherein a portion of the first support and a portion of the second support are received within the receiving gap,
    wherein the joiner assembly comprises a first joiner and a second joiner, wherein the first joiner comprises an upper surface and a lower surface, wherein the second joiner comprises an upper surface and a lower surface, and wherein the lower surface of the first joiner faces the lower surface of the second joiner.

6. The sectional guide pole of claim 5, wherein the receiving gap is defined between at least a portion of the lower surface of the first joiner and at least a portion of the lower surface of the second joiner.

7. The sectional guide pole of claim 5, wherein the guiding channel of the first support is an upper guiding channel, and wherein the first support further comprises a lower guiding channel opposite the upper guiding channel.

8. The sectional guide pole of claim 5, wherein the sectional guide pole further comprises at least one cover detachably secured to the first support and the second support and such that the guiding channels of the first support and the second support are covered.

9. The sectional guide pole of claim 5, further comprising a first mating component on the joiner assembly and a second mating component on the first support or the second support, wherein the first mating component is configured to engage the second mating component such that the first support is secured to the second support through the joiner assembly.

10. A method of assembling a sectional guide pole for wiring comprising:
    detachably securing a joiner assembly on a first support of the sectional guide pole;
    inserting an end of a second support of the sectional guide pole into a receiving gap defined by a first joiner and a second joiner of the joiner assembly; and
    detachably securing the second support to the joiner assembly such that the second support is positioned relative to the first support.

11. The method of claim 10, wherein detachably securing the second support to the joiner assembly comprises positioning the second support relative to the first support such that a guiding channel of the first support is aligned with a guiding channel of the second support.

12. The method of claim 10, wherein detachably securing the second support to the joiner assembly comprises engaging a first mating component on the joiner assembly with a second mating component on the second support.

13. The method of claim 12, wherein the first mating component comprises a latch having an arm, wherein the second mating component comprises a hook, and wherein engaging the first mating component with the second mating component comprises engaging the latch with the hook.

14. The method of claim 12, wherein the first mating component comprises at least one locking tab, wherein the second mating component comprises at least one locking aperture, and wherein engaging the first mating component with the second mating component comprises engaging the at least one locking tab with the at least one locking aperture.

15. The method of claim 10, wherein detachably securing the joiner assembly on the first support comprises inserting an end of the first support between the first joiner and the second joiner such that a portion of the first support is between the first joiner and the second joiner and securing the joiner assembly relative to the first support.

16. The method of claim 10, wherein inserting the end of the second support into the receiving gap defined by a first joiner and a second joiner of the joiner assembly comprises positioning a portion of the first joiner in a first channel defined by the second support and positioning a portion of the second joiner in a second channel defined by the second support.

* * * * *